United States Patent
Neuburger et al.

(10) Patent No.: US 8,286,503 B2
(45) Date of Patent: Oct. 16, 2012

(54) ELECTROMAGNETIC FLOWMETER HAVING A MEASURING TUBE WITH VARYING CROSS SECTION AND WALL THICKNESS

(75) Inventors: Stephan Neuburger, Stadecken-Elsheim (DE); Joseph Neven, Mours (FR)

(73) Assignee: Krohne AG, Basel (CH)

( * ) Notice: Subject to any disclaimer, the term of this patent is extended or adjusted under 35 U.S.C. 154(b) by 226 days.

(21) Appl. No.: 12/619,971

(22) Filed: Nov. 17, 2009

(65) Prior Publication Data

US 2010/0126282 A1    May 27, 2010

(30) Foreign Application Priority Data

Nov. 17, 2008   (DE) .......................... 10 2008 057 755

(51) Int. Cl.
*G01F 1/58* (2006.01)
(52) U.S. Cl. .................................... 73/861.12
(58) Field of Classification Search .................. None
See application file for complete search history.

(56) References Cited

U.S. PATENT DOCUMENTS

| | | | | |
|---|---|---|---|---|
| 4,186,600 A * | 2/1980 | Appel et al. | ............... | 73/861.12 |
| 4,253,340 A * | 3/1981 | Schmoock | ............... | 73/861.12 |
| 4,679,442 A * | 7/1987 | Kubota | ............... | 73/861.12 |
| 5,280,727 A * | 1/1994 | Hafner et al. | ............... | 73/861.12 |
| 6,689,303 B2 * | 2/2004 | Seki et al. | ............... | 264/328.1 |
| 6,817,249 B2 * | 11/2004 | Yamazaki | ............... | 73/861.12 |
| 7,228,748 B2 * | 6/2007 | Keech et al. | ............... | 73/861.12 |
| 7,318,354 B2 * | 1/2008 | Visser et al. | ............... | 73/861.12 |
| 7,930,816 B2 * | 4/2011 | Lincoln et al. | ............... | 29/602.1 |
| 2006/0213284 A1 * | 9/2006 | Visser et al. | ............... | 73/861.12 |
| 2010/0132478 A1 * | 6/2010 | Pelayo | ............... | 73/861.12 |

\* cited by examiner

*Primary Examiner* — Harshad R Patel
(74) *Attorney, Agent, or Firm* — Roberts Mlotkowski Safran & Cole, P.C.; David S. Safran

(57) ABSTRACT

An electromagnetic flowmeter for mass flow measurement of a flowing medium having a measuring tube (1), a magnetic field generator for generating a magnetic field that at least partially passes through the measuring tube (1), two magnetic coils (2), and two electrodes for tapping into a measurement voltage induced in the flowing medium. The measuring tube (1) is designed as an integrally molded metal pipe or as a metal pipe produced integrally by hydroforming. Preferably, the measuring tube has a wall thickness that is smaller at a mid-section than at its ends, and reinforcing ribs in the mid-section.

9 Claims, 5 Drawing Sheets

ELECTROMAGNETIC FLOWMETER HAVING A MEASURING TUBE WITH VARYING CROSS SECTION AND WALL THICKNESS

BACKGROUND OF THE INVENTION

1. Field of the Invention

The invention relates—at first and primarily—to a electromagnetic flowmeter for mass flow measurement of a flowing medium having a measuring tube, a magnetic field generating means for generating a magnetic field at least partially extending through the measuring tube, and having two electrodes for tapping into a measurement voltage induced in the flowing medium. The invention is also directed to other flowmeters, in particular, to ultrasonic flowmeters.

2. Description of Related Art

Electromagnetic flowmeters are extensively known from decades of prior art; here, the reference "Technische Durchflußmessung" (Technical Mass Flow Measurement) by Prof. Dr.-Ing. K. W. Bonfig, 3. Edition, Vulkan-Verlag Essen, 2002, pages 123 to 167 is referred to as an example.

SUMMARY OF THE INVENTION

The basic principle of an electromagnetic flowmeter for measurement of the flow of a flowing medium goes back to Faraday, who had already suggested, in the year 1832, using the principle of electrodynamic induction for measuring the rate of flow of a flowing medium. According to Faraday's law of induction, an electric field strength perpendicular to the direction of flow and to the magnetic field arises in a flowing medium, which carries charge carriers with it and flows through a magnetic field. Faraday's law of induction is used in the case of a electromagnetic flowmeter in that a magnet field generating means, regularly provided with two magnetic coils, generates a magnetic field that at least partially passes through the measurement tube, wherein the generated magnetic field has at least one component that runs perpendicular to the direction of flow. Within this magnetic field, each volume element of the flowing medium moving through the magnetic field and having a certain number of charge carriers together with the field strength arising in this volume element makes a contribution to the measurement voltage tapped by the measuring electrodes.

When, as is described above, electromagnetic flowmeters have been known extensively for decades and exist in a hardly manageable plurality of embodiments, then, as in many further developed fields of technology, further developments are still desired and possible. Therefore, the object of the invention is to improve the electromagnetic flowmeter described above in its basic construction according to very different factors that are of importance alone or also in their entirety.

A first embodiment of an electromagnetic flowmeter according to the invention of the type described above is first and essentially characterized in that the measuring tube is designed as an integrally molded metal pipe. Alternatively, the measuring tube can be designed as a metal pipe integrally formed by means of hydroforming. Hydroforming is a relatively new forming method (see "Wikipedia, the free Encyclopedia"). In hydroforming, a pipe-shaped piece is expanded using inner pressure, and at the same time, is compressed by an axial force. The piece is located in a closed tool before being expanded and takes on the shape of the tool shape through the inner pressure. The inner pressure (up to about 3000 bar and higher) is transferred by means of a water-oil emulsion, the introduction of the axial force takes place using two sealing dies at the pipe ends. In hydroforming, the forming process forms a very complex unit by using the combination of inner pressure, axial force, piece geometry and material data. In practice, estimating and evaluating the parameters is not particularly easy.

If the object of the invention is also, as described above, an electromagnetic flowmeter of the type described in the introduction that is characterized in that the measuring tube is designed as a metal pipe integrally produced by means of hydroforming, then the following is essentially a description of the embodiment in which the measuring tube is designed as an integrally molded metal pipe.

In the electromagnetic flowmeter according to the invention, the measuring tube designed as an integrally molded metal pipe (or the measuring tube designed as metal pipe integrally produced by means of hydroforming) has shapes and/or designs for the affixing, the arranging and/or the accommodating of all components necessary for the function of the electromagnetic flowmeter or, optionally, additional components. This means that, for example, shapes and/or designs for the affixing or the arranging of the magnetic coils belonging to the magnetic field generating means and shapes and/or designs for the accommodating of the electrodes arise during implementation of the measuring tube as an integrally molded metal pipe, i.e. all shapes and/or designs arise in the above-mentioned sense in one and the same production process, thus, subsequent mechanical processing is no longer necessary.

The design of the measuring tube provided according to the invention as an integrally molded metal pipe (or metal pipe integrally produced by means of hydroforming) has, on the one hand, the above-mentioned advantage in respect to production, and on the other hand, however, a substantial advantage in respect to function, and in respect to the initial accuracy as well as in respect to operation safety. Because the measuring tube is designed as an integrally molded metal pipe (or as a metal pipe produced integrally by means of hydroforming) in the electromagnetic flowmeter according to the invention, i.e., the measuring tube "consists of one piece," there are no weak points—given a correct construction of all wall thicknesses, wall thickness changes, etc.—as can occur when the individual parts of a measuring tube designed with multiple parts are joined together, e.g., by means of welding or when the measuring tube has to be subsequently mechanically processed, e.g., holes need to be made for accommodating the electrodes.

A non-magnetic material has to be used for the measuring tube for electromagnetic flowmeters of the type being discussed. Essentially, this can be a plastic, but often stainless steel is used. A second design of an electromagnetic flowmeter according to the invention of the type described in the introduction is, however, first and essentially characterized in that the measuring tube consists of aluminum or an aluminum alloy.

It was described above that, for electromagnetic flowmeters, non-magnetic material has to be used for the measuring tube. Now, it is adequately known that aluminum is a non-magnetic material. Additionally, a known advantage of aluminum is its low weight. Nevertheless, since aluminum was not used up to this point for the measuring tube of the electromagnetic flowmeter, there must have been a reason, an inhibition. This inhibition can possibly be seen in the known good electric conductivity of aluminum.

Although, only aluminum or aluminum-alloys are mentioned above as materials for the measuring tube, the invention is not limited to those materials. A suitable material is also bronze; thus, a copper alloy, preferably at least 60% copper, and a main alloy addition or a plurality of main alloy additions, of which zinc does not predominate. In particular, bronze denotes an alloy of copper and tin. For the case that tin is completely or in part replaced by a different metal, except zinc, the term special-bronze is used (cf. LUEGER LEXIKON DER TECHNIK (Lueger Lexicon of Technology), Vol. 3 "WERKSTOFFE UND WERKSTOFFPRÜFUNG" (Materials and Material Testing), page 93, left column).

In electromagnetic flowmeters of the type described in the introduction, magnetic coils belonging to the magnetic field generating means are generally not powered with direct current, rather with alternating current or, more commonly nowadays, with clocked direct current. The result is that a temporarily changing magnetic field occurs, which according to the law of induction, leads to voltages being induced in electrically conductive materials, which then, when current paths are available, can lead to undesired electric currents, often called eddy currents.

According to the invention, it has now been recognized that aluminum or an aluminum alloy can be used as the material for the measuring tube in an electromagnetic flowmeter, all the same, when it is provided that eddy currents practically do not occur or only in small measures.

Electromagnetic flowmeters of the type described in the introduction are already known which, in addition to the functionally necessary components of measuring tube, magnetic field generating means and electrodes, also has a housing accommodating these components, wherein the measuring tube has a varying cross section over its length and the cross section is smaller at the mid-section of the measuring tube than at the beginning of the measuring tube or at its ends, preferably, the cross section of the measuring tube in its mid-section is rectangular, optionally also square (see, the European patent application publication 1 544 582 and corresponding U.S. Pat. No. 7,228,748). Also, and in particular, in such a design of an electromagnetic flowmeter, it is advised to design the measuring tube as an integrally molded metal pipe or as a metal pipe integrally produced by means of hydro forming.

A preferred design of the last described electromagnetic flowmeter according to the invention is characterized in that the wall thickness of the measuring tube is smaller in the mid-section than at the beginning of the measuring tube or at its ends.

Further, above, it is described that it has been recognized according to the invention that aluminum or an aluminum alloy can be used as the material for the measuring tube of the electromagnetic flowmeter, when it is provided that eddy currents practically do not occur or occur only in small measures. Using this as a basis, there is a preferred design of an electromagnetic flowmeter according to the invention, in which the measuring tube is made of aluminum or an aluminum alloy, characterized in that the wall thickness of the measuring tube is smaller in the mid-section than at the beginning of the measuring tube or at its ends. Here, there is a conflict of interests. On the one hand, the wall thickness of the measuring tube in the mid-section of the measuring tube should be exceptionally small, because this leads to the occurrence of eddy currents being easily limited or even avoided. However, on the other hand—under consideration of the pressure prevailing in the measuring tube—a certain pressure tolerance of the measuring tube is required, even in the mid-section thereof. Further teachings of the invention deal with the above-mentioned conflict of interests.

Another design of an electromagnetic flowmeter according to the invention described in the introduction, in which the above-described measures according to the invention can be implemented, but do not have to be implemented, is characterized in that the measuring tube is provided with reinforcing ribs in its mid-section. If the measuring tube in such an electromagnetic flowmeter is designed as an integrally molded metal pipe or as a metal pipe integrally produced by means of hydroforming, then—for reasons mentioned above—the reinforcing ribs are a part of the measuring tube, i.e., integrally designed with the measuring tube. A design of the electromagnetic flowmeter according to the invention is particularly preferred in which the wall thickness of the measuring tube in the mid-section is smaller than at the beginning of the measuring tube or at its ends, preferably as small as possible in respect to pressure tolerance and the measuring tube is provided with reinforcing ribs in this mid-section. Such a design is essentially better in respect to the reduction or prevention of eddy currents than a design in which the wall thickness of the measuring tube is not reduced in the mid-section and can, thus, can forgo reinforcing ribs.

In detail, there are many possibilities for implementing or, respectively, designing and further developing an electromagnetic flowmeter according to the invention as will be apparent from the following description of embodiments of an electromagnetic flowmeter according to the invention in conjunction with the accompanying drawings.

DETAILED DESCRIPTION OF THE INVENTION

Figure 1:
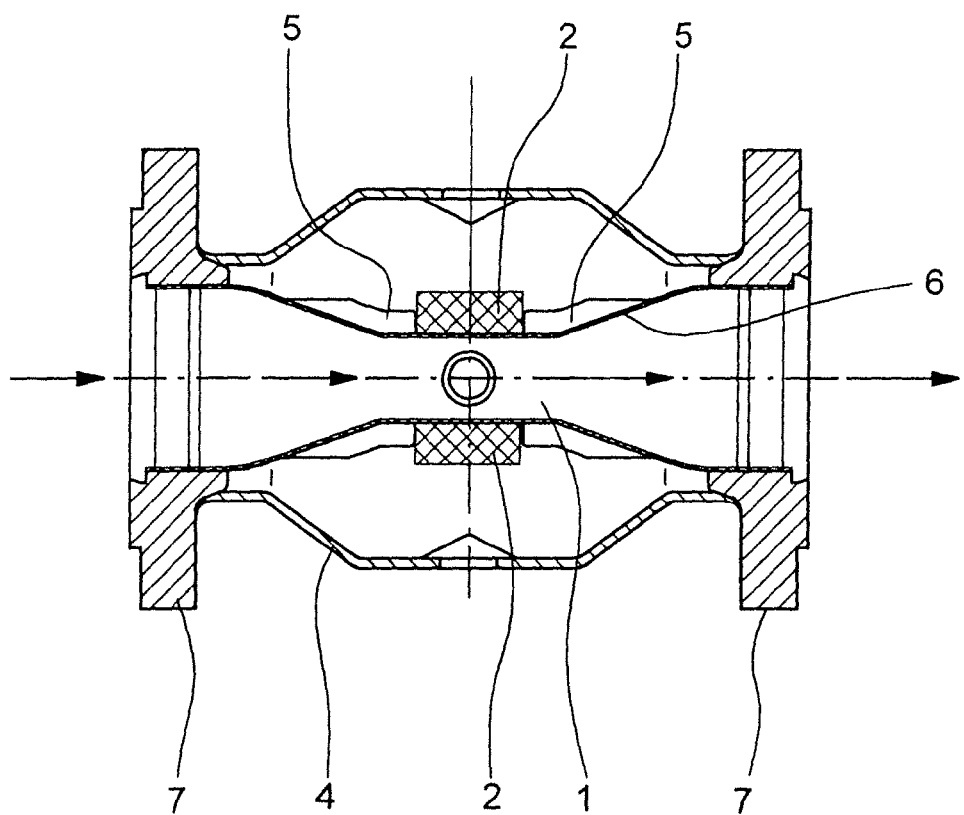
FIG. 1 is a highly schematic, longitudinal sectional view of a preferred embodiment of an electromagnetic flowmeter according to the invention.
Figure 5:
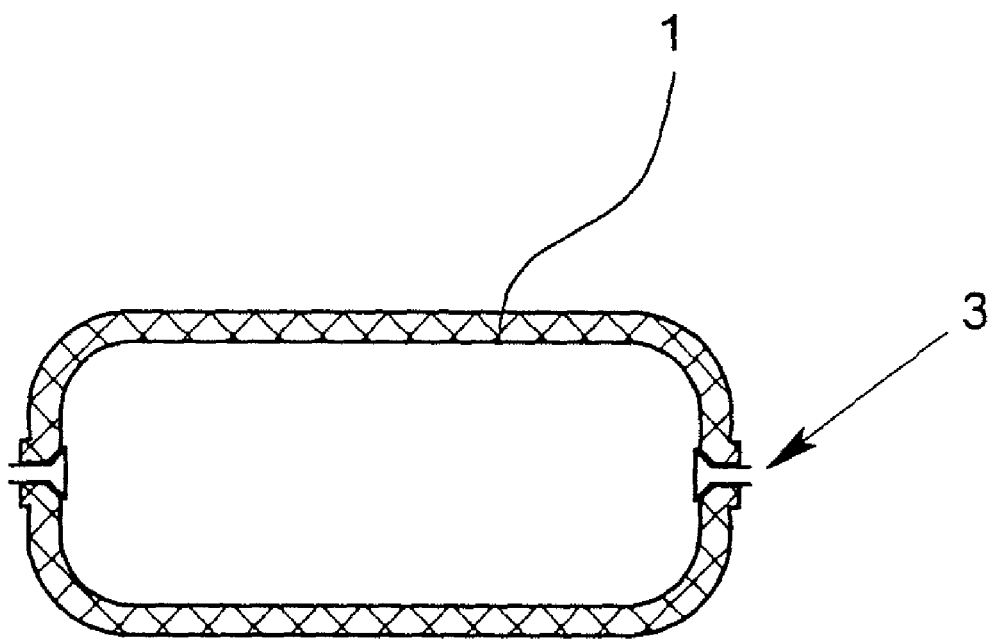
FIG. 5 is a transverse sectional view taken along line V-V in FIG. 4.

The electromagnetic flowmeter shown—essentially only schematically—in FIG. 1 is designated for measuring flow of a flowing medium; it has, functionally necessary, a measuring tube 1, a magnetic field generating means (not shown) for generating a magnetic field that passes at least partially through the measuring tube 1, to which, as indicated in FIG. 1, two magnetic coils 2 belong, and as shown in FIG. 5, two electrodes 3 for tapping a measuring voltage induced in the flowing medium.

First, the measuring tube 1 of the electromagnetic flowmeter according to the invention is formed of an integrally molded metal pipe. The measuring tube 1 formed of integrally molded metal pipe has shapes and designs for the affixing, the arranging and/or the accommodating of all components necessary for the function of the electromagnetic flowmeter and additional components, which is only partially shown or, respectively, indicated in the figures. This means that shapes and designs for the affixing or arranging of the magnetic coils 2 belonging to the magnetic field generating means and also shapes and designs for the accommodating the electrodes 3 arise together with the implementation of the measuring tube 1 as integrally molded metal pipe, i.e., that all shapes and/or designs in the above-mentioned sense are provided in one and the same production process, so that no subsequent mechanical processing is necessary.

It is functionally necessary for the electromagnetic flowmeter according to the invention that the measuring tube 1 is made of a non-magnetic material. Generally, plastic can be used as a non-magnetic material, however, stainless steel is often used. According to a further teaching of the invention, which alone is also of particular importance, the electromagnetic flowmeter according to the invention is, however, characterized in that the measuring tube 1 is made of aluminum or an aluminum alloy.

In electromagnetic flowmeters, the magnetic coils 2 belonging to the magnetic field generating means are generally not powered by direct current, rather with alternating current or, which is more common nowadays, with clocked direct current. According to the law of induction, this temporarily changing magnetic field leads to voltages being induced in electrically conductive materials. These voltages can then, when current paths are provided, lead to undesired electric currents, which are often called eddy currents. Thus, losses can occur, which are naturally not desired, through the temporarily changing magnetic field resulting from the induced voltages and the flowing currents caused thereby.

Under consideration of that, which has been described above, the use of aluminum for the measuring tube 1 is actually prohibited, because it has good electric conductivity. However, it has been recognized according to the invention that, nevertheless, aluminum or an aluminum alloy can be used for the measuring tube 1 in an electromagnetic flowmeter, when it is provided that eddy currents practically do not occur or occur only in small measures.

For the illustrated, preferred embodiment of an electromagnetic flowmeter according to the invention, it is further valid that it has a housing 4, which encloses the functionally necessary components, i.e., the measuring tube 1, the magnetic coils 2 of the magnetic field generating means and the electrodes 3.

Figure 2:
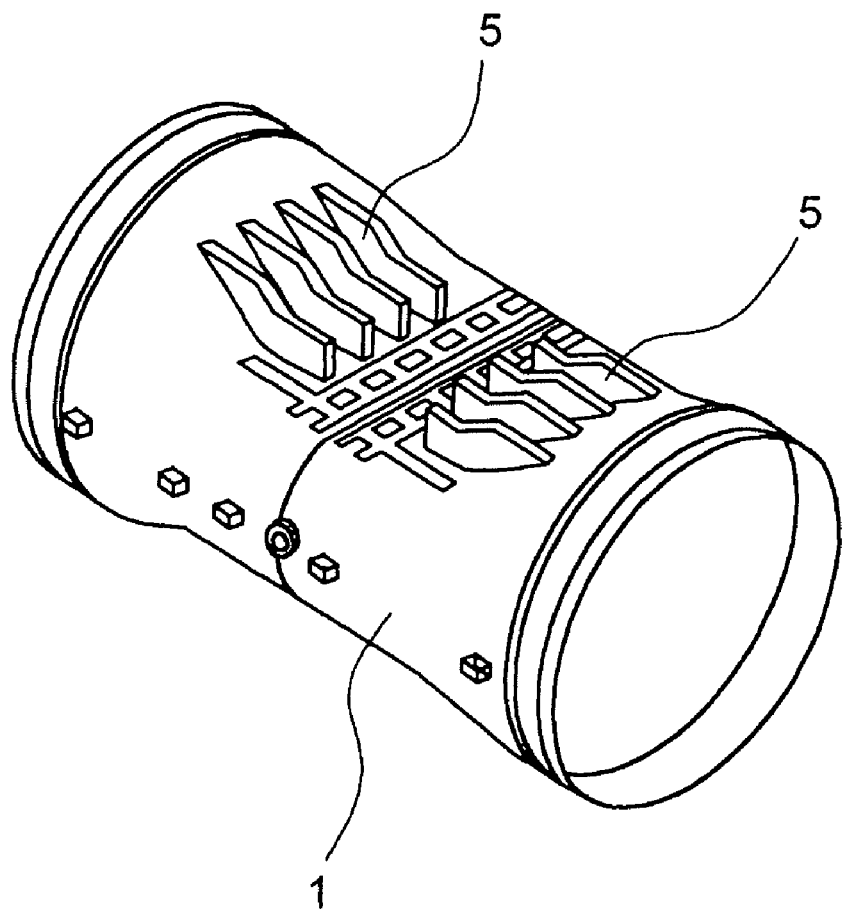
FIG. 2 is a perspective view of a measuring tube of the electromagnetic flowmeter according to FIG. 1.

In addition, it is valid for the particular illustrated embodiment of an electromagnetic flowmeter according to the invention that the measuring tube 1 has a cross section that varies along its length and the cross section in the mid-section of the measuring tube 1 is less than at its ends; preferably, the cross section of the measuring tube 1 is rectangular at its mid-section, which is shown in FIGS. 2 & 5; the cross section of the measuring tube 1 can also be square at its mid-section.

If, as is described above, the measuring tube 1 of the electromagnetic flowmeter according to the invention is made of aluminum or an aluminum alloy, the occurrence of eddy currents can be greatly reduced by the measuring tube 1 having different wall thicknesses over its length, namely, with the wall thickness of the measuring tube 1 in the mid-section being smaller than at its ends.

The reduction of the wall thickness of the measuring tube 1 at its mid-section is subject to natural limitations; there is a conflict of interests. On the one hand, the wall thickness of the measuring tube 1 in the mid-section of the measuring tube 1 should be exceptionally thin, because this can limit particularly well or even prevent the occurrence of eddy currents. On the other hand, however, a certain pressure tolerance of the measuring tube 1 is required at its mid-section.

It can be seen from the particularly preferred embodiment of an electromagnetic flowmeter according to the invention shown in FIGS. 1 to 4 that the measuring tube 1 is provided with reinforcement ribs 5 in the mid-section. If, according to the further teaching of the invention mentioned above, the measuring tube 1 is designed as an integrally molded metal pipe, then the reinforcement ribs 5 are a part of the measuring tube 1, i.e., also are integrally molded as part of the measuring tube 1.

Figure 3:
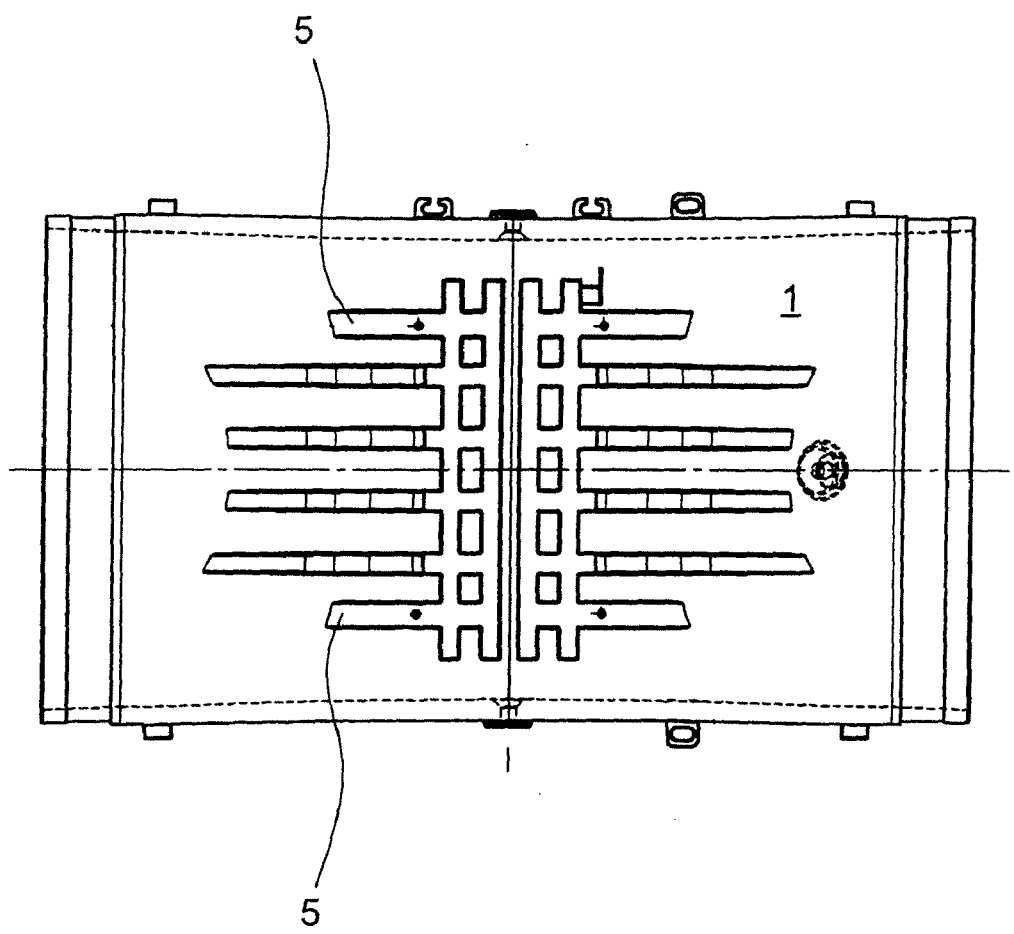
FIG. 3 is a top plan view of the measuring tube of the electromagnetic flowmeter according to FIG. 1, that is enlarged relative to that according to FIG. 2.
Figure 4:
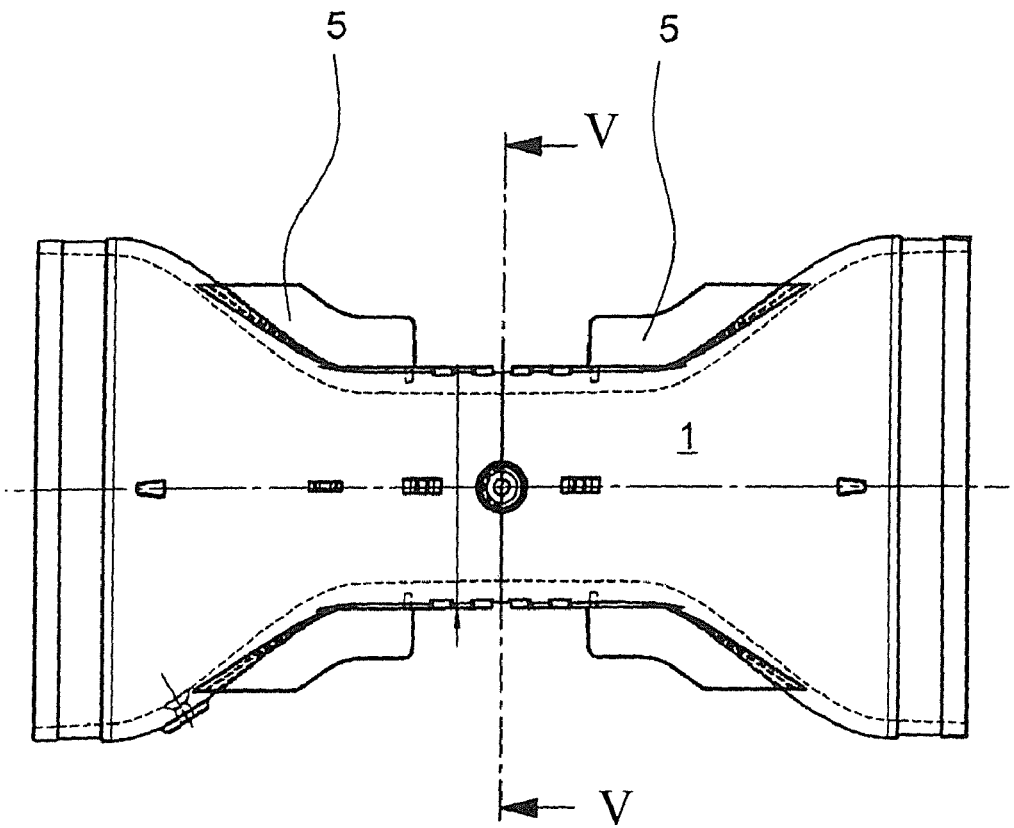
FIG. 4 is a side view of the measuring tube of the electromagnetic flowmeter according to FIG. 1, that is enlarged relative to that according to FIG. 2.

An embodiment of the electromagnetic flowmeter according to the invention is shown and particularly preferred in which the wall thickness of the measuring tube 1 in the mid-section is smaller than at the beginning of the measuring tube 1 and at its ends, preferably as small as is possible for the factor of pressure tolerance and the measuring tube 1 is provided with reinforcement ribs 5 in this section which extend longitudinally into transition section 6 as can be seen in FIGS. 1 & 2. This embodiment is substantially better in respect to reduction or, respectively, prevention of eddy currents than an embodiment in which the wall thickness of the measuring tube 1 is not decreased and, thus, can forgo reinforcement rings 5. The ends of the housing and measuring tube are connected to flanges 7 which, as conventional serve to connect the flowmeter 1 to pipes of a flow line. As shown in FIGS. 2 and 3, transversely extending reinforcement ribs extend between the sets of the longitudinal extending reinforcement ribs 5.

What is claimed is:

1. Electromagnetic flowmeter for mass flow measurement of a flowing medium, comprising:
   a measuring tube,
   a magnetic field generating means for generating a magnetic field that passes at least partially through the measuring tube, and
   two electrodes for tapping into a measurement voltage induced in the flowing medium
   wherein the measuring tube is an integrally molded metal pipe,
   wherein the molded metal pipe have a cross section that varies along its length, the cross section in a mid-section of the measuring tube being smaller than at its ends,
   wherein the measuring tube has a wall thickness that is smaller at the mid-section than at its ends, and
   wherein the measuring tube is provided with reinforcing ribs in the mid-section.

2. Electromagnetic flowmeter according to claim 1, wherein the measuring tube has all elements for affixing, arranging and accommodating all components necessary for the function of the of the electromagnetic flowmeter formed as integral parts of the molded metal pipe.

3. Electromagnetic flowmeter according to claim 1, wherein the measuring tube is made of a material selected from the group consisting of aluminum, an aluminum alloy and bronze.

4. Electromagnetic flowmeter according to claim 1, wherein integrally molded metal pipe has been formed by means of hydroforming.

5. Electromagnetic flowmeter according to claim 1, wherein the measuring tube has rectangular cross section in a mid-section thereof.

6. Electromagnetic flowmeter according to claim 1, wherein the measuring tube has a square cross section in a mid-section thereof.

7. Electromagnetic flowmeter according to claim 1, wherein the measuring tube is provided with a plurality of at least longitudinally extending reinforcing ribs which extend across a transition region between the smaller mid-section and the larger ends.

8. Electromagnetic flowmeter according to claim 7, further comprising a plurality of transversely extending reinforcing ribs.

9. Electromagnetic flowmeter according to claim 8, wherein the transversely extending reinforcing ribs intersect said longitudinally extending reinforcing ribs.

* * * * *